Sept. 14, 1965   A. I. KEMPPINEN ETAL   3,205,692
METHOD OF PRODUCING HOLLOW EXTRUDED PRODUCTS
Filed Nov. 6, 1963
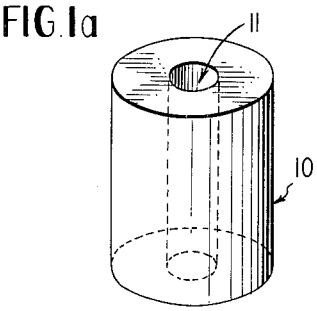
FIG.1a  FIG.1b
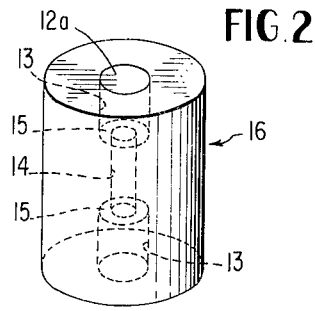
FIG.2
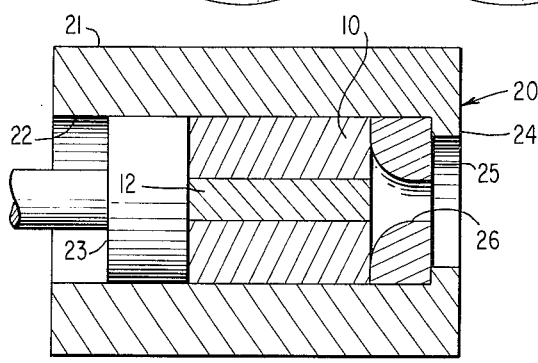
FIG.3
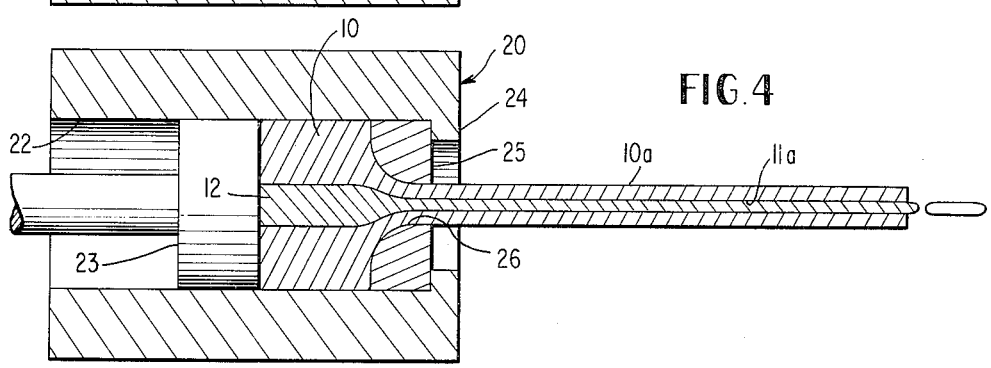
FIG.4
FIG.5
FIG.6
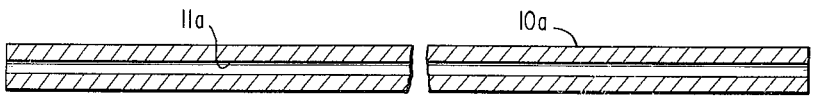
FIG.7
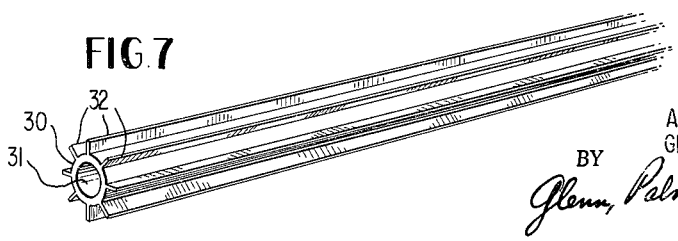
INVENTORS.
AUVO I. KEMPPINEN
GROVER C. ROBINSON, JR.
BY Glenn, Palmer, & Matthews
ATTORNEYS

United States Patent Office 3,205,692
Patented Sept. 14, 1965

3,205,692
METHOD OF PRODUCING HOLLOW EXTRUDED PRODUCTS
Auvo I. Kemppinen, Henrico County, and Grover C. Robinson, Jr., Richmond, Va., assignors to Reynolds Metals Company, Richmond, Va., a corporation of Delaware
Filed Nov. 6, 1963, Ser. No. 321,905
9 Claims. (Cl. 72—264)

This invention relates to a method of working a formable metal billet, and more particularly to an improved method and billet for producing hollow metal extrusions.

In the art of extruding metal articles containing inner passages or cavities, a core or filler material may be employed initially to fill these passages or cavities. Such material must have sufficient physical strength to support the walls of the extrusion under the pressure and temperatures involved in the extrusion process. After the article has been extruded, the core material then must be removed. This removal has proven to be difficult, tedious and time consuming, particularly when an extrusion cavity has a varying cross-section.

Under the pressures and with the extrusion rates and other conditions which have been employed in the past it has been found that the relationship between the characteristics of the filler material and those of the billet metal govern to a great extent the uniformity of dimensions in the extruded article. Thus, if a filler material is more readily deformable than the billet metal, the reduction in the cross-sectional area of the billet cavity during the extrusion would be proportionally greater than that of the metal. In addition, this cavity cross-sectional area would often undesirable vary along the length of the hole. On the other hand, should the filler material be less readily deformable than the metal, it would act somewhat as a mandrel in the extrusion process. In this manner, the filler material might pass through the die before the extrusion of the metal was complete and the trailing end of the extruded section would contain little or no filler. The cross-sectional area of the hole thus formed would then be irregular toward the terminal portion of the billet.

It has also become apparent that conventional operation of the extrusion process at high temperature has placed limitations on the variety of shapes that can be extruded successfully since, at elevated temperatures, thin walls such as fins and the like often collapse during the extrusion process.

Recognizing the deficiencies of prior extrusion techniques, it is an object of the present invention to provide an improved method of extruding metal articles which contain inner passages or cavities.

It is another object of the present invention to provide an improved method of extruding hollow metal articles, which method does not require the step of preheating the metal prior to extrusion or the step of removing filler material after the extrusion process.

It is also an object of the invention to provide an extrusion technique wherein a relatively soft filler may be employed in forming extruded articles having accurately defined passages or cavities.

It is still another object of the present invention to provide an improved method of making hollow aluminum extrusions, which extrusions may possess cavities the cross-section of which varies along the length thereof in a controlled manner.

It is still a further object of this invention to provide billets and filler materials to be employed in the making of hollow aluminum extrusions, which filler materials do not require their removal from the hollow extrusion after the extrusion process.

In the present invention, extremely high forces are applied during a short period of time to force a billet through the orifice of an extrusion die. A substantial portion of the energy imparted to the billet is converted to heat as the billet is reformed during the extrusion process, with the result that the temperature of the extruded article rises considerably. The billet filler or core material employed has a melting temperature sufficiently below the exit temperature of the extrusion that the core material is melted or at least substantially softened during passage through the extrusion die. The core material should also have a sufficiently low specific heat to insure a rapid temperature rise therein.

A particular feature of the invention resides in the use of core or filler material having a melting temperature appreciably below that of the billet, such that heat generated during the extrusion process melts or softens at least a substantial portion of the filler material which then may be ejected in the course of the extruding operation.

A further desired characteristic of the core material is sufficient strength that the cavity or passage walls of the metal being extruded may be supported effectively during the extrusion process by the deformation resistance of the filler.

Due to the forces involved and the short duration of the extrusion cycle, considerable momentum is imparted to the liquid or semi-liquid filler material while the extruded hollow article is decelerated at the end of the extrusion cycle. As a result, the filler material is effectively ejected out of the extruded end of the article, the internal cavity having been left open for this purpose. This ejection is substantially aided by having a filler of high specific gravity.

Because of the low melting temperature of the core or filler materials employed, extrusions can be accomplished by using initial billet temperatures at or near room temperature, so that thin walls such as fins employed on heat-exchanger tubing and the like can be readily extruded since the metal never becomes hot enough for such thin walls to collapse.

Other objects, advantages, and features will become more readily apparent from the following description, when taken in conjunction with the accompanying drawings in which:

FIGURE 1–a is an illustration of a typical billet having an internal cavity or hole extending throughout the length thereof;

FIGURE 1–b is an illustration of such a billet after it has been filled with a filler or core material;

FIGURE 2 illustrates an embodiment of the type of billet that may be employed with the present invention in which the billet cavity diameter is not constant;

FIGURE 3 depicts a typical billet in the billet container just prior to the extrusion process;

FIGURE 4 is an illustration of the partially reformed billet during the extrusion process;

FIGURE 5 is a cross-sectional view of the extrusion obtained from the billet illustrated in FIGURE 1–a;

FIGURE 6 is a cross-sectional view of the extrusion obtained from the billet illustrated in FIGURE 2; and FIGURE 7 is a perspective view of a typical article that may be extruded by the process of the present invention.

As illustrated in FIGURE 1–a, a typical billet is formed from metal blank 10 having a cross-section of such a shape as to be readily received by an extrusion press. In this particular embodiment, the cross-section is circular, as would be required for the extrusion of screw machine stock, tubing and the like. Blank 10 is provided with a cavity, or hole 11, which extends along the axis of the blank and throughout the length thereof. As illustrated in FIGURE 1–b, cavity 11 of blank 10 is provided with filler material 12, which material has particular physical characteristics as will later be described. The ratio of the diameter of cavity 11 to the outer diameter of blank 10 is determined by the desired inner and outer diameters of the extruded article and by the extrusion ratio employed during the extrusion process.

It will be understood that the cross-sectional shape of the inner cavity is not limited by the process employed in the present invention. For example, in FIGURE 2 there is illustrated a billet having a cavity that varies along the axis of the billet, which variation may be chosen to produce any given design for the extruded article as may be desired. In the embodiment illustrated in FIGURE 2, the particular cavity design is formed by two larger bores 13 that extend part way into blank 16 from both ends thereof, which bores terminate at flat surfaces 15. To provide a continuous cavity throughout the length of the billet, blank 16 is also provided with smaller bore 14 connecting the two larger bore cavities 13, the respective bores and blank 16 all being coaxial. As in the case of the embodiment illustrated in FIGURE 1–b, the cavity formed in blank 16 of FIGURE 2 is filled with a core of filler material 12–a which may be the same as filler material 12 illustrated in FIGURE 1–b. It will be appreciated, furthermore, that more than one cavity may be provided in a blank; and it is not necessary to have a cavity which is coaxial with the blank.

The material from which blanks 10 and 16 are formed may be any metal suitable for extrusion and the filler material employed is selected to meet the requirements of the particular metal used for the blank.

After the formation of a typical billet such as illustrated in FIGURE 1–b, the billet is inserted into an extrusion press, a portion of which is schematically shown in FIGURE 3. Extrusion press 20 includes a cylinder or billet container 21 having an inner bore 22 into which fits a ram 23. Cylinder 21 may be provided at one end with flange 24, thereby being adapted to receive and retain an extrusion die 25.

As illustrated in FIGURE 3, metal blank 10 is inserted in cylinder 21 so as to be forced by the ram 23 against extrusion die 25. During the extrusion cycle, ram 23 forces the billet through the die in the manner illustrated in FIGURE 4. As the billet is forced through the extrusion die, the resulting extruded shape 10–a continues to move away from the press until pressure is no longer applied by ram 23. As contemplated in the present invention, the pressure applied to the billet may be, for example, of the order of 200,000 p.s.i. and the extrusion cycle time may be of the order of 50 milliseconds. When the core or filler material is of the type contemplated in the present invention, the rise in the temperature of the core or filler material will be such as to melt the core material. The extrusion is decelerated at the end of the extrusion cycle. Because of the momentum imparted to the core material, it may be ejected from cavity 11–a of the newly formed extrusion 10–a.

As a result of this process, extrusion 10–a will be left with a clean bore 11–a that is substantially free of any core or filler material, even though this extrusion may be of considerable length.

The advantages obtained by this process can be achieved with a variety of cross sections of the internal cavity. For example, in FIGURE 5, there is shown a cross section of the extrusion obtained from a billet of the configuration shown in FIGURE 1–a wherein bore 11–a has a diameter determined by the operating conditions, including the extrusion ratio of the extrusion press and the relation between the diameter of cavity 11 and outer diameter of blank 10 in FIGURE 1–a. FIGURE 6 is illustrative of extrusions obtained from a billet having the configuration illustrated in FIGURE 2. With reference to FIGURE 6, the relative positions between inner surfaces 13–a, 14–a, and 15–a differs from relative positions between corresponding inner surfaces 13, 14, and 15 of FIGURE 2 as a result of the extrusion process. Even though the relatively enlarged cavity portion 13 was separated from the leading end of the billet by the relatively restricted portion 14, no difficulty was encountered in effecting expulsion of the melted core.

As will be later described in the specific examples, it is contemplated that billets of aluminum alloys will attain a temperature in the vicinity of 600° to 700° F. during the extruding step. Appropriate core or filler materials to be employed in the present invention preferably have a high specific gravity and low specific heats, in addition to melting temperatures in or below the range of 600° to 700° F.

It will be appreciated that the exit temperature of the extrusion may vary and sometimes be lower than the melting point of the given core material. Under such circumstances, even where the core material does not actually melt, it nevertheless will be softened to an extent that the yield strength and other characteristics of the material will be sufficiently altered for plastic deformation of the core material to be readily achieved.

Materials which have been found to be suitable core materials for use in the extrusion of aluminum alloys include the lead-bismuth alloys which have melting temperatures ranging from about 293° to about 612° F. depending upon the percentages of the respective elements in the alloy, and cadmium-bismuth alloys which have melting temperatures ranging from about 487° to 610° F. These alloys are particularly suitable for employment in the extrusion of relatively soft aluminum alloys. However, when harder aluminum alloys are extruded, it has been found that lead serves as an excellent filler material, lead having a melting temperature of approximately 621° F. and a higher density or specific gravity.

The lead-bismuth alloys have a specific gravity ranging between 9.8 and 11.34 depending upon the respective percentages of the two elements and these alloys have a specific heat on the order of 0.03 B.t.u./lb./° F. at room temperature. The cadmium-bismuth alloys have a specific gravity ranging from 8.6 to 9.8 and a specific heat varying from about 0.03 to about 0.06 at room temperature depending upon the percentages of the respective elements. Lead itself has a specific gravity of 11.34 and a specific heat of approximately 0.03 at room temperature. In contrast thereto, the aluminum alloys employed as the preferred extrusion metal have a specific gravity of approximately 2.7 depending upon the particular alloy and a specific heat of approximately 0.23 at room temperature.

It will be understood that the temperatures involved are achieved by the heating effect which results from the extrusion process; and the metal to be extruded may reside at a temperature at or near room temperature at the beginning of the extrusion cycle. Furthermore, the temperature never approaches the molten range of the extrusion material during the entire extrusion cycle. Therefore, many disadvantages of hot working of the material are overcome by the present invention. For example, heat exchanger tubing which includes thin fins on the outside thereof can now be readily extruded without fear of collapsing the fins as the metal is not maintained long enough at a sufficiently high temperature for such phenomenon to occur. An example of such heat exchanger tubing is illustrated in FIGURE 7 where fins 32 have a thickness less than the wall thickness of tube 30 having an inner bore 31.

To illustrate the specific type of core materials contemplated by the present invention, specific examples will now be given of practices employing a suitable high-energy extrusion press (Model 1200 Dynapak).

*Example 1*

For the extruding of a relatively soft aluminum alloy of the 6000 series, having magnesium and silicon as the major alloying elements, filler material consisting essentially of 60 percent bismuth and 40 percent cadmium was employed which has a melting point of about 291° F. Under extrusion conditions providing an exit temperature of approximately 600° to 650° F., melting of the entire core material was completely insured. A round billet, 1½ inches in diameter by 3 inches in length was drilled to obtain an inner diameter of 0.281 inch. The core was filled with the cadmium-bismuth filler material and the ambient temperature billet was extruded at an extrusion ratio of 19.6. After extruding, the inner bore was found to be substantially free of the filler material and measured 0.0625 inch in diameter with an outer diameter of 0.375 inch.

*Example 2*

In the second example, the metal blank was formed of a 2000 series aluminum alloy in which major alloying element was copper. In aluminum alloys of this type, the amount of copper may vary typically from 1.9 to 6.8 percent. Since aluminum alloys of this type are characterized by a greater hardness and a higher yield strength, it was found that a filler material with a higher melting point could be used. In this example, the filler material was lead and the exit temperature of the extrusion was approximately 650°–700° F. The billet used in this example had similar dimensions to that used in Example 1, and comparable results were obtained.

While the method described above has been devised primarily for the making of hollow aluminum extrusions, it can be employed for fabricating any hollow extrusion having constant or variable internal and external cross-sections depending on the geometry of the billet inner cavity and providing that there exists a filler material having a melting point lower than that of the billet metal. It is preferable, of course, to select a filler material which can be melted and ejected during the extrusion process. Optimum removal of the insert or filler material may be obtained by choosing the conditions for extruding so that the filler material is allowed to perform its sizing function before it is ejected through the open end of the extrusion. Otherwise, it may be desirable to employ an acid dip to remove any residue that may be remaining on the walls of the cavity.

With the methods of the present invention small bore extrusions can be readily obtained with accurate dimensions. Other products include small internal diameter heavy wall hollows such as hollow screw machine stock and heavy wall small internal diameter pressure tubing which can be made in a single deformation operation. In order to reproduce the dimensions of such tubing by conventional extrusion methods, heavy reductions have to be effected after extruding due to mandrel size limitations involved and this increase in the number of operations is eliminated by the present invention.

While the present invention has been described in conjunction with the presently preferred embodiments, it is to be understood that modifications and variations may be made without departing from the spirit and scope of the invention as understood by those skilled in the art and that such modifications and variations are considered to be within the purview and scope of the invention and the appended claims.

What is claimed is:

1. The method of making a hollow extrusion from an extrudable billet comprising a formable metal blank having a cavity therein, said billet being provided with an opening in at least one end thereof which communicates with said cavity and the cavity containing filler material characterized by having a lower melting temperature than the metal of said blank, which method comprises:
   placing the billet in an extrusion press with the opening to said cavity facing toward the extrusion die;
   extruding said billet through the die at an extrusion rate sufficient to cause the heating of said filler material to a temperature which at least approaches its melting temperature; and
   decelerating the emerging extrusion so as to eject filler material at the extruded end of the billet.

2. The method of treating a formable metal billet having a cavity therein containing a lower melting filler material, which comprises: rapidly working said billet while heating said filler material to a temperature at which it is at least substantially softened, and immediately thereafter ejecting said softened filler material from said cavity.

3. The method of claim 2, in which said working causes said heating.

4. The method of claim 2, in which said working includes the extruding of said billet through an orifice and said filler material is ejected from said cavity after passing through said orifice.

5. The method of claim 2, in which said substantially softened filler material is liquid.

6. The method of making a hollow extrusion from an extrudable billet comprising a formable metal blank having therein a cavity containing filler material, which method comprises; rapidly moving said billet through an extrusion orifice so as to form an extrusion, and immediately thereafter ejecting the moving filler material from the cavity in said extrusion.

7. The method of claim 6, in which said filler material is ejected by decelerating the surrounding metal portion of the extrusion.

8. The method of making a hollow extrusion from an extrudable billet comprising a formable metal blank having a cavity therein, said cavity containing filler material having an appreciably lower melting temperature than the metal of said blank, which method comprises: placing said billet in an extrusion press at a billet temperature substantially below the melting temperature of said filler material, rapidly moving said billet through an extrusion orifice so as to form an extrusion, thereby heating said filler material to a temperature at which it is at least substantially softened, and immediately thereafter ejecting the moving, softened filler material from the cavity in said extrusion.

9. The method of claim 8, in which said billet is provided in at least one end thereof with an opening which communicates with said cavity, said billet is placed in said extrusion press with said opening facing toward said orifice, and said filler material is ejected through an opening in said extrusion corresponding to the opening in said billet.

References Cited by the Examiner

UNITED STATES PATENTS

| | | | |
|---|---|---|---|
| 2,021,945 | 11/35 | Payne | 29—423 |
| 2,093,773 | 9/37 | Colwell | 29—156.7 |
| 2,300,353 | 10/42 | Ekerhardt | 29—423 |
| 2,891,307 | 6/59 | Betteridge | 29—423 |
| 2,941,281 | 6/60 | Hignett | 29—423 |
| 2,948,957 | 8/60 | Sawyer | 29—423 |

(Other references on following page)

UNITED STATES PATENTS

| | | | |
|---|---|---|---|
| 2,975,509 | 3/61 | Sejournet | 207—10.3 |
| 2,986,806 | 6/61 | Hignett et al. | 207—10.3 |

FOREIGN PATENTS

| | | |
|---|---|---|
| 763,141 | 12/56 | Great Britain. |

OTHER REFERENCES

"How To Bend Tuber and Sections," reprinted from Iron Age, November 7, 1940, by Cerro de Pasco Cooper Corp.

References Cited by the Applicant

UNITED STATES PATENTS

| | | |
|---|---|---|
| 1,980,716 | 11/34 | Colwell. |
| 2,093,774 | 9/37 | Colwell. |
| 2,312,094 | 2/43 | Harmon. |
| 2,628,417 | 2/53 | Peyches. |
| 2,836,884 | 6/58 | Graham. |

CHARLES W. LANHAM, *Primary Examiner.*
MICHAEL V. BRINDISI, *Examiner.*